(12) United States Patent
Kusuda

(10) Patent No.: US 11,161,178 B2
(45) Date of Patent: Nov. 2, 2021

(54) CUTTING INSERT, CUTTING TOOL, AND METHOD OF MANUFACTURING MACHINED PRODUCT

(71) Applicant: KYOCERA Corporation, Kyoto (JP)

(72) Inventor: Yukihiro Kusuda, Dongguan (CN)

(73) Assignee: KYOCERA CORPORATION, Kyoto (JP)

(*) Notice: Subject to any disclaimer, the term of this patent is extended or adjusted under 35 U.S.C. 154(b) by 245 days.

(21) Appl. No.: 16/346,331

(22) PCT Filed: Oct. 23, 2017

(86) PCT No.: PCT/JP2017/038197
§ 371 (c)(1),
(2) Date: Apr. 30, 2019

(87) PCT Pub. No.: WO2018/079491
PCT Pub. Date: May 3, 2018

(65) Prior Publication Data
US 2019/0262907 A1 Aug. 29, 2019

(30) Foreign Application Priority Data
Oct. 31, 2016 (JP) .............................. JP2016-212697

(51) Int. Cl.
*B23B 27/16* (2006.01)
*B23B 27/04* (2006.01)
*B23B 27/22* (2006.01)

(52) U.S. Cl.
CPC ............ *B23B 27/16* (2013.01); *B23B 27/045* (2013.01); *B23B 27/22* (2013.01);
(Continued)

(58) Field of Classification Search
CPC ................ B23B 5/14; B23B 2200/081; B23B 2200/286; B23B 2200/126;
(Continued)

(56) References Cited

U.S. PATENT DOCUMENTS 4,973,204 A * 11/1990 Mihic .................. B23B 27/045
407/116
4,992,008 A * 2/1991 Pano ..................... B23B 27/045
407/114
(Continued)

FOREIGN PATENT DOCUMENTS

JP 2002-254216 A 9/2002
WO 2011/052667 A1 5/2011
(Continued)

*Primary Examiner* — Nicole N Ramos
(74) *Attorney, Agent, or Firm* — Volpe Koenig

(57) ABSTRACT

A cutting insert according includes a first surface and a cutting edge. The first surface includes a first inclined surface and a projection. The first inclined surface includes a first region located close to a first corner portion, a second region located close to a second corner portion, and a third region located between the first region and the second region. The projection includes a first projection located close to the first corner portion and a second projection located close to the second corner portion. A first top portion of the first projection is located closer to the first corner portion than a first boundary portion between the first region and the third region, and a second top portion of the second projection is located closer to the second corner portion than a second boundary portion between the second region and the third region.

13 Claims, 17 Drawing Sheets

(52) U.S. Cl.
CPC ... *B23B 2200/049* (2013.01); *B23B 2200/207* (2013.01); *B23B 2200/32* (2013.01); *B23B 2200/369* (2013.01)

(58) Field of Classification Search
CPC ... B23B 2200/12; B23B 27/04; B23B 27/045; B23B 27/22; B23B 27/16; B23B 27/143; B23B 2200/32; B23B 2200/321; B23B 2200/323; B23B 2200/325; B23B 2200/049; B23C 3/28; B23C 2200/0494; B23C 2200/27; B23C 2210/74
See application file for complete search history.

(56) References Cited

U.S. PATENT DOCUMENTS

| | | | | |
|---|---|---|---|---|
| 5,779,401 | A * | 7/1998 | Stallwitz | B23B 27/045 407/11 |
| 5,827,017 | A * | 10/1998 | Tagstrom | B23B 27/045 407/116 |
| 7,883,300 | B1 * | 2/2011 | Simpson, III | B23B 27/045 407/115 |
| 8,770,895 | B2 * | 7/2014 | Inoue | B23B 27/045 407/115 |
| 10,118,228 | B2 * | 11/2018 | Ikenaga | B23B 27/045 |
| 2003/0156909 | A1 * | 8/2003 | Tong | B23B 27/045 407/117 |
| 2008/0240875 | A1 * | 10/2008 | Nagaya | B23B 27/045 407/113 |
| 2012/0210834 | A1 | 8/2012 | Onodera | |
| 2013/0192431 | A1 | 8/2013 | Inoue | |
| 2014/0147219 | A1 * | 5/2014 | Kaufmann | B23B 27/10 407/11 |
| 2014/0290450 | A1 * | 10/2014 | Fujii | B23B 27/045 82/1.11 |
| 2015/0056029 | A1 * | 2/2015 | Shimamoto | B23B 27/045 407/115 |
| 2015/0078844 | A1 * | 3/2015 | Majima | B23B 27/143 407/114 |
| 2015/0158088 | A1 | 6/2015 | Inoue | |
| 2015/0158089 | A1 * | 6/2015 | Inoue | B23B 27/143 82/1.11 |
| 2017/0232524 | A1 * | 8/2017 | Makhlin | B23B 27/1622 407/114 |

FOREIGN PATENT DOCUMENTS

| | | | | |
|---|---|---|---|---|
| WO | 2012/043629 | A1 | 4/2012 | |
| WO | 2014/017623 | A1 | 1/2014 | |
| WO | WO-2017043520 | A1 * | 3/2017 | ........... B23B 27/045 |

\* cited by examiner

US 11,161,178 B2

CUTTING INSERT, CUTTING TOOL, AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2017/038197 filed on Oct. 23, 2017, which claims priority to Japanese Application No. 2016-212697 filed on Oct. 31, 2016, which are entirely incorporated herein by reference.

TECHNICAL FIELD

The present disclosure relates to a cutting insert, a cutting tool, and a method of manufacturing a machined product.

BACKGROUND ART

Conventionally, a throw-away tip (cutting insert) described in Japanese Unexamined Patent Application Publication No. 2002-254216A (Patent Document 1) has been known as a cutting insert used in groove-forming. In the cutting insert described in Patent Document 1, a front cutting edge is provided with a circular arcuate recess portion, and a rake surface is provided with a spherical recess portion extending to the circular arcuate recess portion. The front cutting edge and the rake surface are used to squeeze chips.

In the cutting insert described in Patent Document 1, the front cutting edge is circular arcuate and is also in a convex shape. This allows for chip squeezing action to improve chip processability but causes a step to be formed on a surface of a workpiece. Thus, separate machining is required for obtaining a flat machined surface. As a result, machining efficiency may be reduced.

An object of the present disclosure is to provide a cutting insert that exhibits high chip processability and achieves high machining efficiency.

SUMMARY OF INVENTION

A cutting insert according to the present disclosure includes a first surface including a first corner portion, a second corner portion, and a first side located between the first corner portion and the second corner portion, a second surface located away from the first surface, a third surface connecting to the first side of the first surface and to the second surface, and a cutting edge located on a ridge line where the first surface and the third surface intersect. The cutting edge includes a first cutting edge located on the first side. The first surface includes a first inclined surface located along the first side and inclined toward the second surface while extending away from the first side, and a convex projection. The first inclined surface includes a first region located close to the first corner portion, a second region located close to the second corner portion, and a third region located between the first region and the second region. The projection includes a first projection located close to the first corner portion and a second projection located close to the second corner portion. The first region has an inclination angle $\theta 1$ increasing while extending away from the first corner portion in a direction along the first cutting edge, and the second region has an inclination angle $\theta 2$ increasing while extending away from the second corner portion in the direction along the first cutting edge. The third region has an inclination angle $\theta 3$ equal to or greater than the inclination angle $\theta 1$ of the first region and the inclination angle $\theta 2$ of the second region. In a front view of the first surface, a first top portion of the first projection is located closer to the first corner portion than a first boundary portion B1 between the first region and the third region in the direction along the first cutting edge. A second top portion of the second projection is located closer to the second corner portion than a second boundary portion B2 between the second region and the third region in the direction along the first cutting edge.

DESCRIPTION OF EMBODIMENT

Cutting Insert

A cutting insert according to an embodiment of the present disclosure will be described below in detail with reference to the drawings. Note that, for convenience of description, the figures referenced below illustrate, in a simplified manner, major members included in the constituent members of an embodiment and required for describing the embodiment. Accordingly, the cutting insert of the present disclosure may be provided with an optional constituent member that is not illustrated in the referenced figures. Also, dimensions of the members in each figure are illustrated as examples for the cutting insert of the present disclosure. Accordingly, the cutting insert of the present disclosure is not limited to the dimensions of the members in each figure.

First Embodiment

Description will be given below of a cutting insert 1 according to First Embodiment of the present disclosure (also referred to below simply as the insert 1) while referencing FIGS. 1 to 14. The insert 1 in an example illustrated in FIG. 1 may be used in groove-forming. As in the example illustrated in FIG. 1, the insert 1 may be in the form of a triangular plate.

Figure 1:
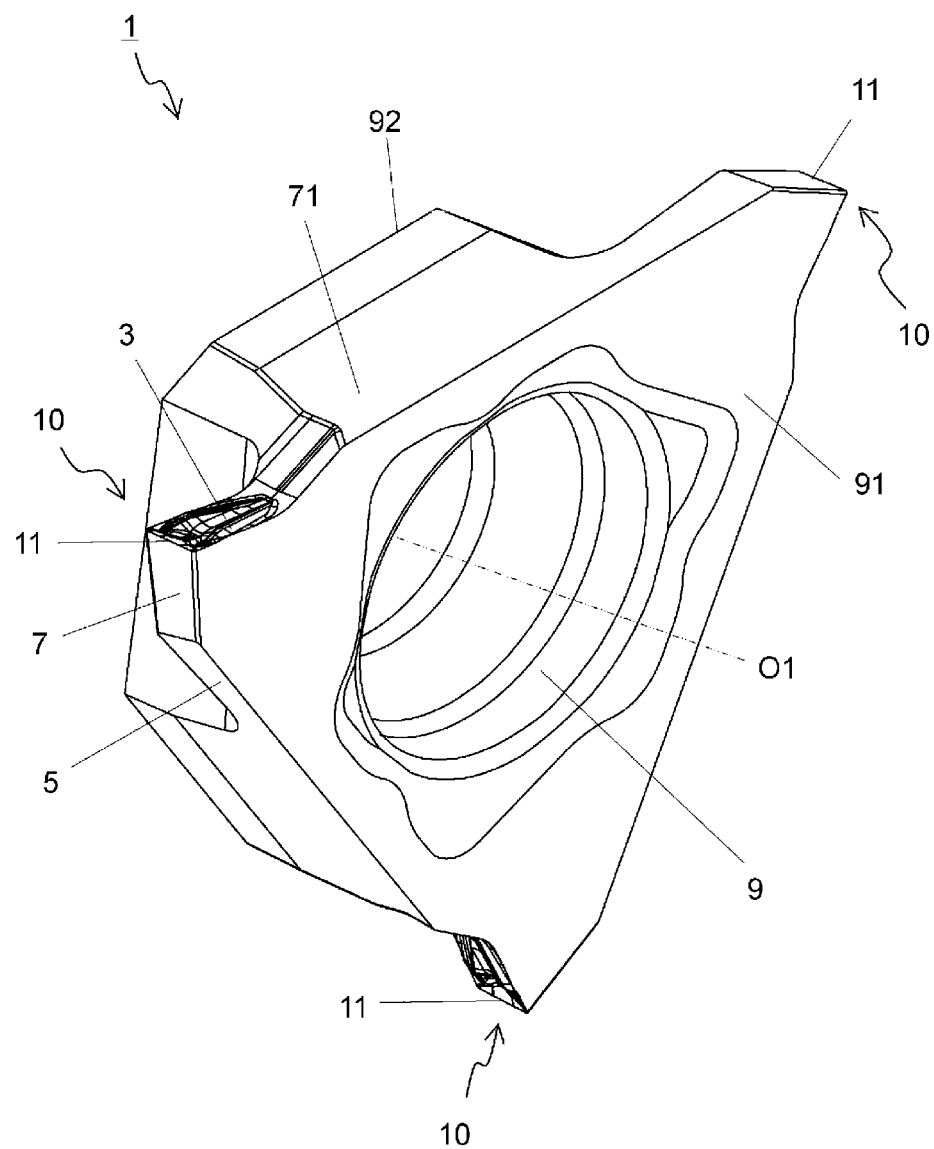
FIG. 1 is a perspective view illustrating a cutting insert according to an embodiment of the present disclosure.
Figure 3:
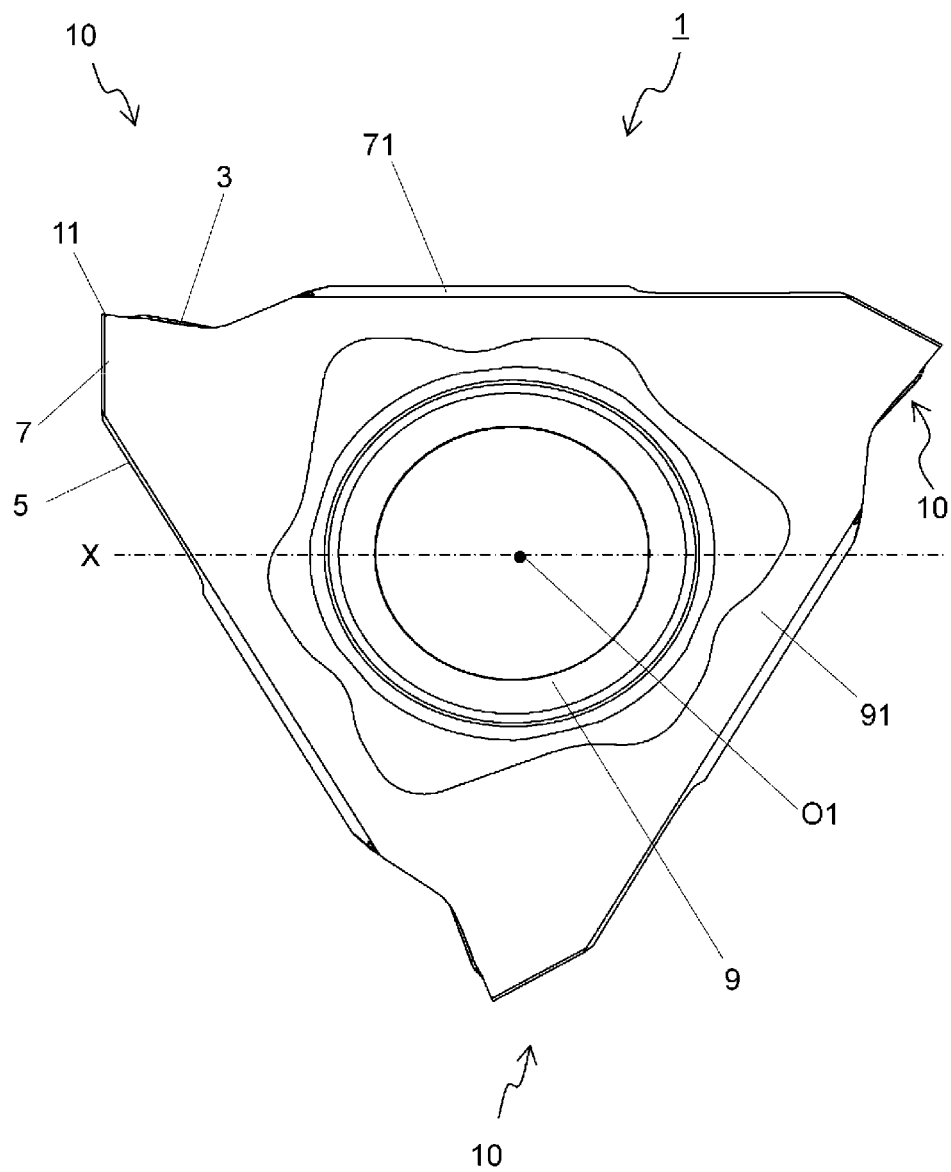
FIG. 3 is a side view of the cutting insert illustrated in FIG. 1 as viewed from a direction A1 in FIG. 2.

In particular, the insert 1 may include a triangular first major surface 91 with three corners, as illustrated in FIGS. 1 and 3. A second major surface 92 in the example illustrated in FIG. 1 is located opposite a first major surface 91. A cutting portion 10 may be provided in portions of the first major surface 91 corresponding to corners. In an example illustrated in FIG. 3, the first major surface 91 is triangular, and thus the insert 1 has three cutting portions 10.

The cutting portion 10 may include a first surface 3, a second surface 5 located away from the first surface 3, and a third surface 7 located between the first surface 3 and the second surface 5. The third surface 7 may be connected to each of the first surface 3 and the second surface 5. The first surface 3, the second surface 5, and the third surface 7 in the example illustrated in FIG. 1 are each located between the first major surface 91 and the second major surface 92. In this case, the first surface 3, the second surface 5, and the third surface 7 in the example illustrated in the drawing are each connected to the first major surface 91.

The first surface 3 can be used as a surface on which chips mostly flow during cutting such as groove-forming. That is, the first surface 3 can function as what is known as a rake surface.

Figure 2:
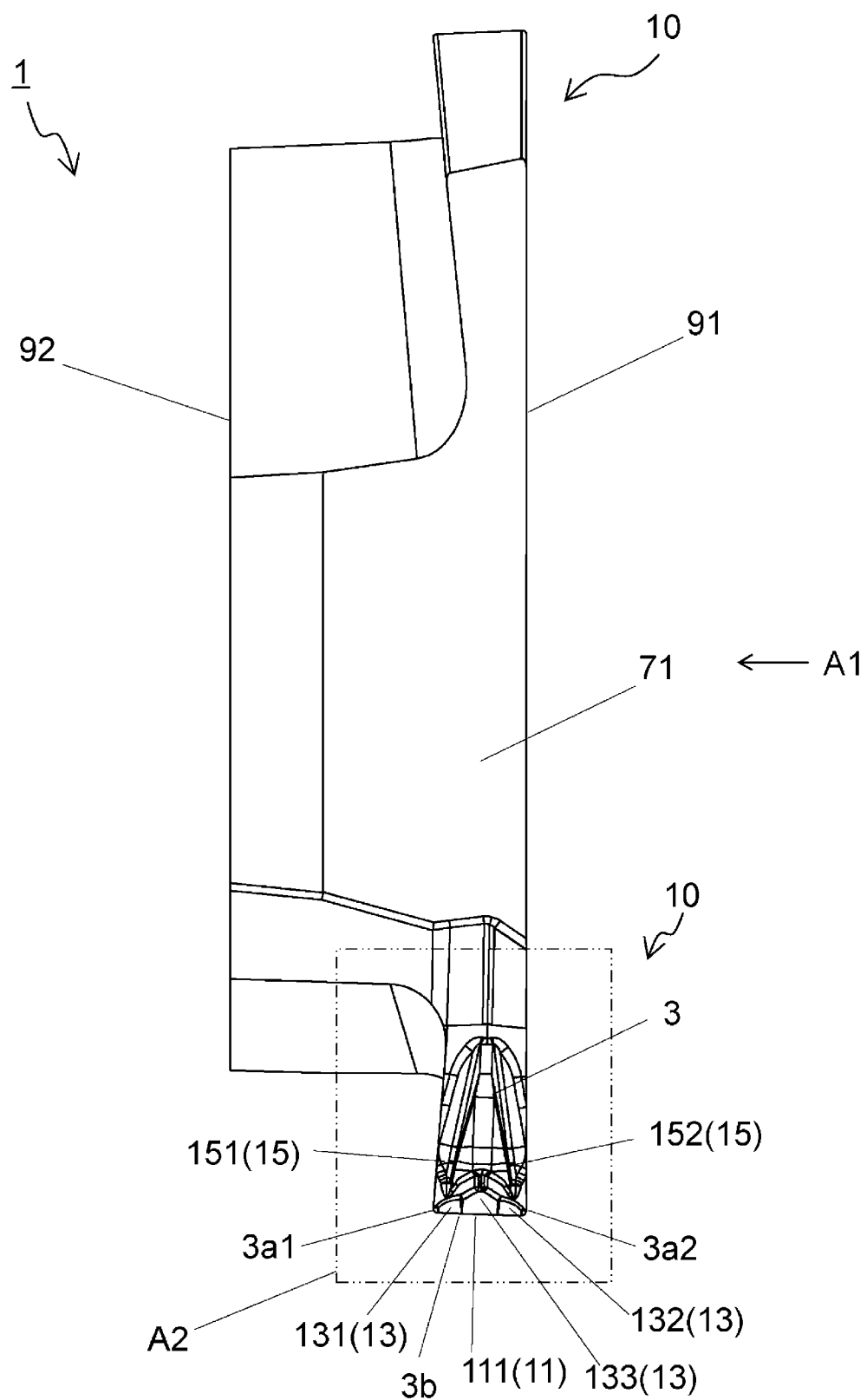
FIG. 2 is a top view of a first surface of the cutting insert illustrated in FIG. 1.

In top view, the first surface 3 in an example illustrated in FIG. 2 has a polygonal shape and includes a plurality of corner portions and a plurality of sides. The first surface 3 in the example illustrated in FIG. 2 has a quadrangular shape. Thus, the first surface 3 in the example illustrated in FIG. 2 includes at least a first corner portion 3a1, a second corner portion 3a2, and a first side 3b. The first side 3b is located between the first corner portion 3a1 and the second corner portion 3a2.

Here, the polygonal shape does not strictly mean a shape of a polygon. For example, the corner portions of the first surface 3 illustrated in FIG. 3 do not strictly form corners. Also, sides connecting adjacent corner portions need not to be strictly linear. Also, the view directly from above means a state in which the insert 1 is viewed toward the first surface 3.

The second surface 5 in the example illustrated in FIG. 1 is located away from the first surface 3 with the third surface 7 interposed between the second surface 5 and the first surface 3. A portion of the second surface 5 can function as a bearing surface to be attached to a holder when the insert 1 is mounted in the holder.

Note that the second surface 5 in the example illustrated in FIG. 1 can be described as being located opposite the first surface 3 in that the third surface 7 is interposed between the second surface 5 and the first surface 3. Here, the second surface 5 being located opposite the first surface 3 does not strictly mean the second surface 5 is being located opposite the first surface 3. As illustrated in FIGS. 1 and 3, it is sufficient that the second surface 5 is substantially located opposite the first surface 3, and the arrangement of the second surface 5 and the first surface 3 can be determined by the shape of the insert 1.

Also, the insert 1 may also include a flat planar region 71 located between the first major surface 91 and the second major surface 92. In the insert 1 in the example illustrated in FIG. 1, the planar region 71 is adjacent to the first surface 3 and opposite the first side 3b of the first surface 3.

As described above, since the second surface 5 need not to be strictly located opposite the first surface 3, a virtual straight line X may be set as described below, and "upper" and "lower" may be set with reference to this virtual straight line X.

Specifically, the virtual straight line X is set to extend parallel to a ridge line where the first major surface 91 and the planar region 71 intersect and to pass through the center of the first major surface 91. As illustrated in FIG. 3, in a case where the first major surface 91 is viewed in front view, "upper" may be defined as the direction from the virtual straight line X toward the first surface 3, and "lower" may be defined as the direction from the first surface 3 toward the virtual straight line. In a case where the insert 1 includes the planar region 71, the height position of the first surface 3 may be evaluated based on the planar region 71.

The first major surface 91 of the example illustrated in FIG. 3 has a triangular shape, but the shape of the first major surface 91 is not limited to this. For example, the first major surface 91 and the second major surface 92 may each be shaped like a polygon such as a quadrilateral or a pentagon.

The third surface 7 in the example illustrated in FIGS. 1 and 3 is located between the first side 3b and the second surface 5 of the first surface 3, and is connected to the first surface 3 and the second surface 5. The third surface 7 in the example illustrated in FIGS. 1 and 3 can be located on a lateral side of a cutting tool in a case where the insert 1 is mounted in a holder, as described below. Thus, the third surface 7 in the example illustrated in FIG. 1 may also be designated as the side surface 7. The side surface 7 can function as what is known as a flank surface in a case where a work material is cut using the insert 1.

The insert 1 in the example illustrated in FIGS. 1 and 3 includes a through-hole 9 formed to extend from the center of the first major surface 91 toward the center of the second major surface 92. The through-hole 9 is formed to allow a set screw to be inserted into the through-hole 9 to threadably fasten the insert 1 to the holder of the cutting tool.

A central axis O1 of the through-hole 9 coincides with a virtual straight line passing through the center of the first major surface 91 and the center of the second major surface 92. Also, the central axis O1 of the through-hole 9 coincides with a central axis of the insert 1. Accordingly, the central axis O1 of the through-hole 9 may be replaced with the central axis of the insert 1. The central axis of the insert 1 is an axis passing between the first and second major surfaces 91 and 92, and means that an axis serves as a rotation axis when insert 1 is rotated.

Examples of a material of the insert 1 include cemented carbide alloy and cermet. Examples of the composition of the cemented carbide alloy include WC—Co, WC—TiC—Co, and WC—TiC—TaC—Co. WC—Co is produced by adding a cobalt (Co) powder to tungsten carbide (WC) and sintering the mixture. WC—TiC—Co is formed by adding titanium carbide (TiC) to WC—Co. WC—TiC—TaC—Co is formed by adding tantalum carbide (TaC) to WC—TiC—Co.

Also, cermet is a sintered composite material obtained by combining a metal with a ceramic component. Specifically, examples of the cermet include compounds in which a titanium compound such as titanium carbide (TiC) or titanium nitride (TiN) is the primary component.

The surface of the insert 1 may be coated with a coating film using a chemical vapor deposition (CVD) method or a physical vapor deposition (PVD) method. Examples of composition of the coating film include titanium carbide (TiC), titanium nitride (TiN), titanium carbonitride (TiCN), and alumina ($Al_2O_3$).

The insert 1 may include a cutting edge 11 located on a ridge line where the first surface 3 and the side surface 7 intersect. The insert 1 in the example illustrated in FIG. 1 includes the cutting edge 11 located in each of the three cutting portions 10 on the ridge line where the first surface 3 and the side surface 7 intersect. The cutting edge 11 is used to cut a work material in machining. The cutting edge 11 may be located all along the ridge line where the first surface 3 and the side surface 7 intersect or only on a part of the ridge line described above.

The regions where the first surface 3 and the side surface 7 intersect and where the cutting edge 11 is located may be subjected to what is known as honing. In a case where the regions where the first surface 3 and the side surface 7 intersect are honed into curved shapes, the strength of the cutting edge 11 is improved. Examples of the honing include R-honing.

Figure 4:
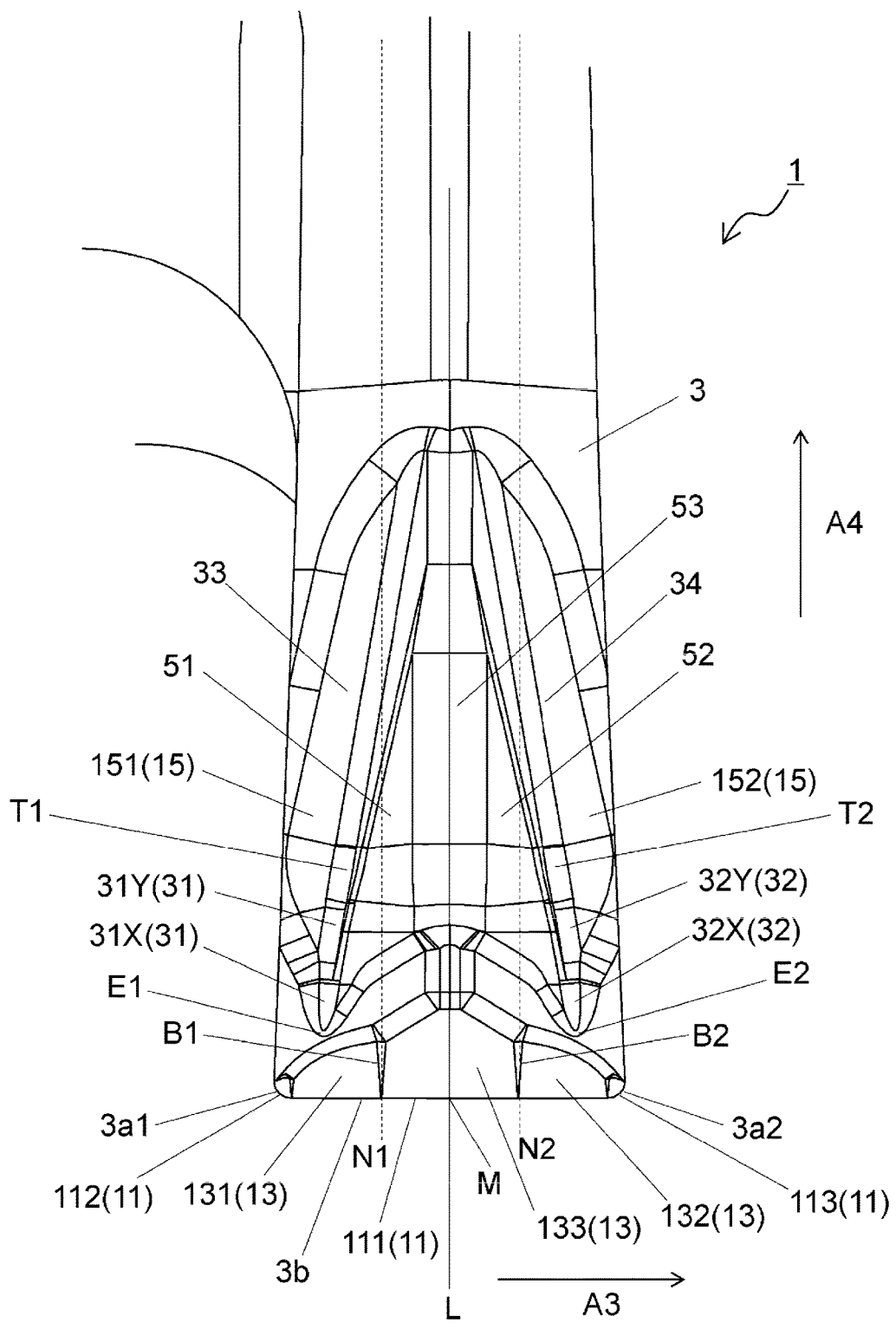
FIG. 4 is an enlarged view of a region A2 of the cutting insert illustrated in FIG. 2.
Figure 5:
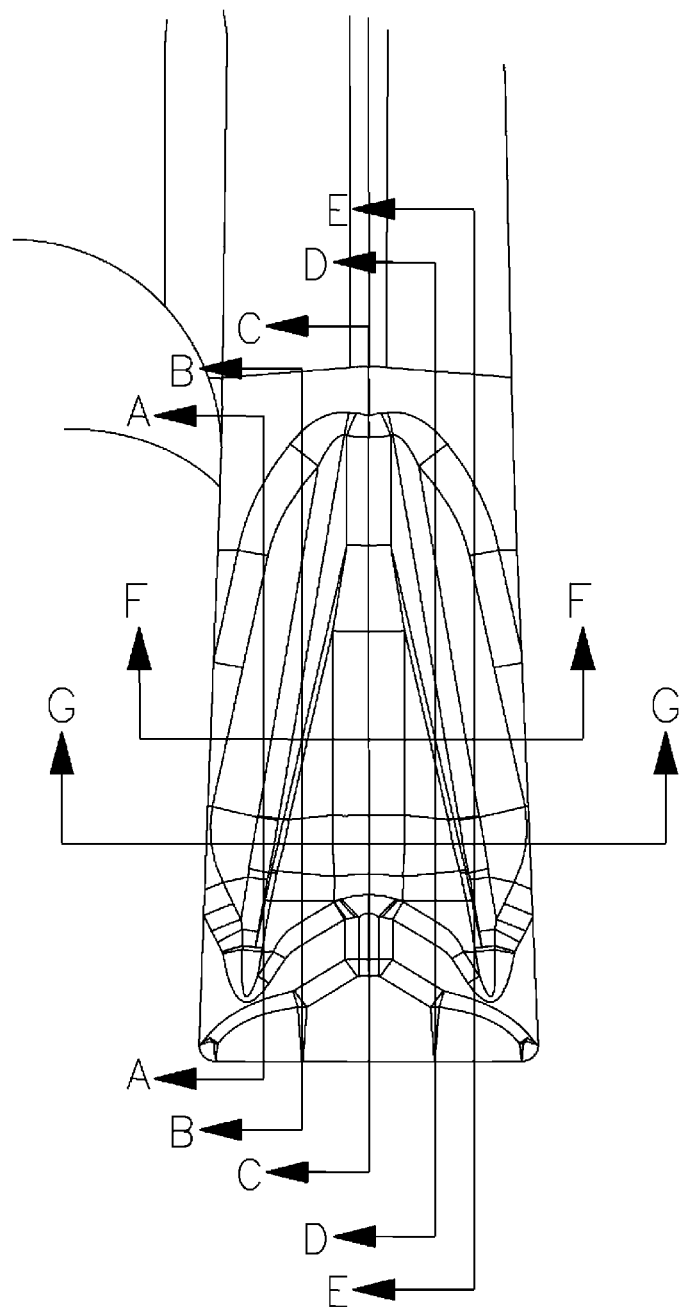
FIG. 5 is a diagram corresponding to FIG. 4 and illustrating positions of cross sections in FIGS. 7 to 13.

The cutting edge 11 in the example illustrated in FIG. 4 includes the first cutting edge 111 located on the first side 3b of the first surface 3. The first cutting edge 111 can function as what is known as a front cutting edge in groove-forming. Also, the cutting edge 11 may include a second cutting edge 112 located at the first corner portion 3a1 and a third cutting edge 113 located at the second corner portion 3a2. The second and third cutting edges 112 and 113 can function as what is known as corner cutting edges.

The first surface 3 illustrated in FIGS. 4 to 12 includes a first inclined surface 13 and a projection 15. The first inclined surface 13 in one example is located along the first side 3b and is inclined toward the second surface 5 while extending away from the first side 3b. In other words, the first inclined surface 13 in an example of the embodiment approaches the virtual straight line X while extending away from the first side 3b. In the example illustrated in FIG. 4, the first inclined surface 13 of the first surface 3 can function as a rake surface. The first inclined surface 13 in the example illustrated in FIG. 4 includes a first region 131 located close to the first corner portion 3a1, a second region 132 located close to the second corner portion 3a2, and a third region 133 located between the first region 131 and the second region 132.

The projection 15 is a portion that is convex and that rises upward from the first surface 3. In other words, the projection 15 in an example illustrated in FIG. 7 projects from the first surface 3 in a direction away from the virtual straight line X. The projection 15 is located inward of the first cutting edge 111 on the first surface 3. The projection 15 is located in a direction in which chips formed by the first cutting edge 111 flow and can be used to control the flow of chips. Specifically, the projection 15 can play a role in curving the chips or controlling the direction in which chips flow.

Note that here, "inner side" means a front side in a direction in which chips formed by the first cutting edge 111 flow when viewed from above. The projection 15 in the example illustrated in FIG. 4 includes a first projection 151 located close to the first corner portion 3a1 and a second projection 152 located close to the second corner portion 3a2.

Here, the first inclined surface 13 and the projection 15 described above have the following relationship in the embodiment. That is, as illustrated in FIGS. 8 to 12, the first region 131 has an inclination angle $\theta 1$ increasing while extending away from the first corner portion 3a1 in a direction along the first cutting edge 111 (hereinafter, also simply referred to as the A3 direction). Also, the second region 132 has an inclination angle $\theta 2$ increasing while extending away from the second corner portion 3a2 in the direction along the first cutting edge 111 (A3 direction). The third region 133 has an inclination angle $\theta 3$ equal to or greater than the inclination angle $\theta 1$ of the first regions 131 and the inclination angle $\theta 2$ of the second regions 132. In other words, $\theta 3 \geq \theta 1$ and $\theta 2$.

Furthermore, in the example illustrated in FIG. 4, in a front view (top view) of the first surface 3, a first top portion T1 of the first projection 151 is located closer to the first corner portion 3a1 than a first boundary portion B1 between the first region 131 and the third region 133 in the direction (A3 direction) along the first cutting edge 111. Also, a second top portion T2 of the second projection 152 is located closer to the second corner portion 3a2 than a second boundary portion B2 between the second region 132 and the third region 133 in the direction along the first cutting edge 111 (A3 direction).

In an example of the embodiment, the first inclined surface 13 and the projections 15 have the relationship as described above, thus the chips formed by the first cutting edge 111 are first squeezed into a concave shape in the A3 direction by the first inclined surface 13 having different inclination angles $\theta 1$ to $\theta 3$. That is, the chips are raised by coming into contact with the first region 131 and the second region 132, located at opposite ends in the A3 direction and having a relatively small scoop angle, and are then squeezed into a concave shape by being sunken deep down in the third region 133, located at the center in the A3 direction and having a relatively large scoop angle.

The chips squeezed into a concave shape are further deformed in the A3 direction by the first projection 151 and the second projection 152, located away from the first cutting edge 111. That is, a portion of the chips raised by the first region 131 and the second region 132 is suitably brought into contact with and curled by the first top portion T1 of the first projection 151 and the second top portion T2 of the second projection 152.

Since the chips are suitably squeezed in the A3 direction, there is a reduced possibility that the chips will contact a machined wall surface, thus improving the accuracy of the machined wall surface. As a result, a machined wall surface with high surface accuracy is obtained by a single machining process, thus both high chip processability and high machining efficiency can be combined.

Here, the inclination angles $\theta 1$ to $\theta 3$ correspond to what is known as rake angles. The rake angle can be defined in a cross section perpendicular to the first cutting edge 111, for example, as illustrated in FIGS. 7 to 12. For example, the inclination angle $\theta 1$ may be evaluated by the angle at which a virtual extended line of the first region 131 intersects the virtual straight line X in a cross section perpendicular to the first cutting edge 111 and meeting the first region 131. Similarly, the inclination angle $\theta 2$ may be evaluated by the angle at which the virtual extended line of the first region 131 intersects the virtual straight line X in a cross section perpendicular to the first cutting edge 111 and intersecting the second region 132.

Also, the inclination angle θ1 of the first region 131 increasing while extending away from the first corner portion 3a1 in the A3 direction means that inclination angle θ1 does not decrease while extending away from the first corner portion 3a1 in the A3 direction. Accordingly, the inclination angle θ1 does not need to increase all over the length of the first region 131, and the first region may include a portion where the inclination angle θ1 is constant. In this respect, the inclination angle θ2 of the second region 132 is similar to the inclination angle θ1 of the first region 131.

The inclination angle θ3 of the third region 133 may vary or may be constant, in the A3 direction. In an example illustrated in FIG. 9, the inclination angle θ3 is constant in the A3 direction.

For example, the inclination angle θ1 may range from 5° to 30°, the inclination angle θ2 may range from 5° to 30°, and the inclination angle θ3 may range from 10° to 30°. Note that the maximum value of the inclination angle θ1 may be equal to the maximum value of the inclination angle θ2, and the minimum value of the inclination angle θ1 may be equal to the minimum value of the inclination angle θ2. Note that two angles being equal to each other means that it is only required that the angles are substantially identical, for example, there may be a difference of ±2° between the two values.

Figure 7:
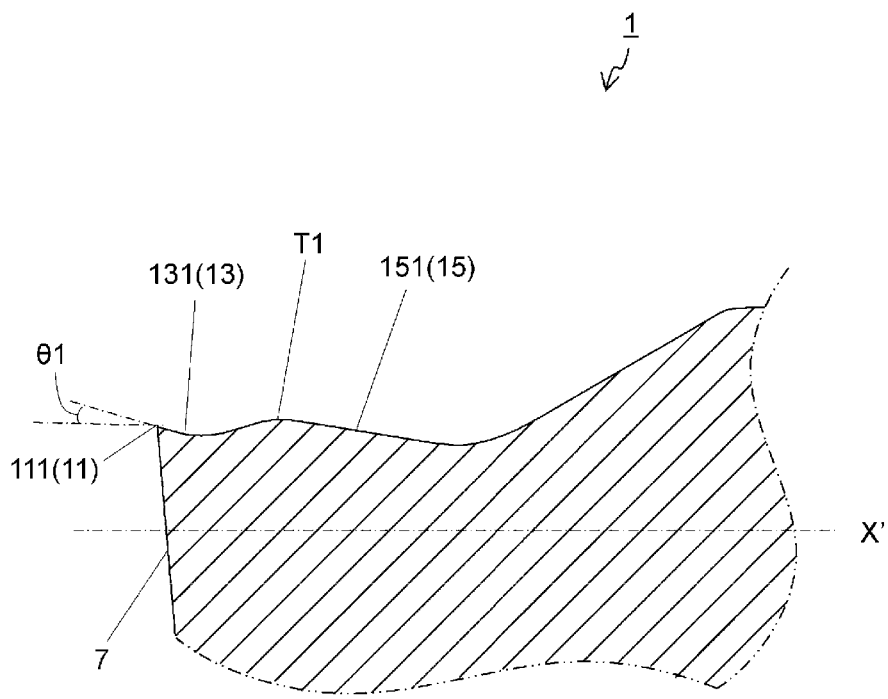
FIG. 7 is a cross-sectional view taken along line A-A in FIG. 5.
Figure 11:
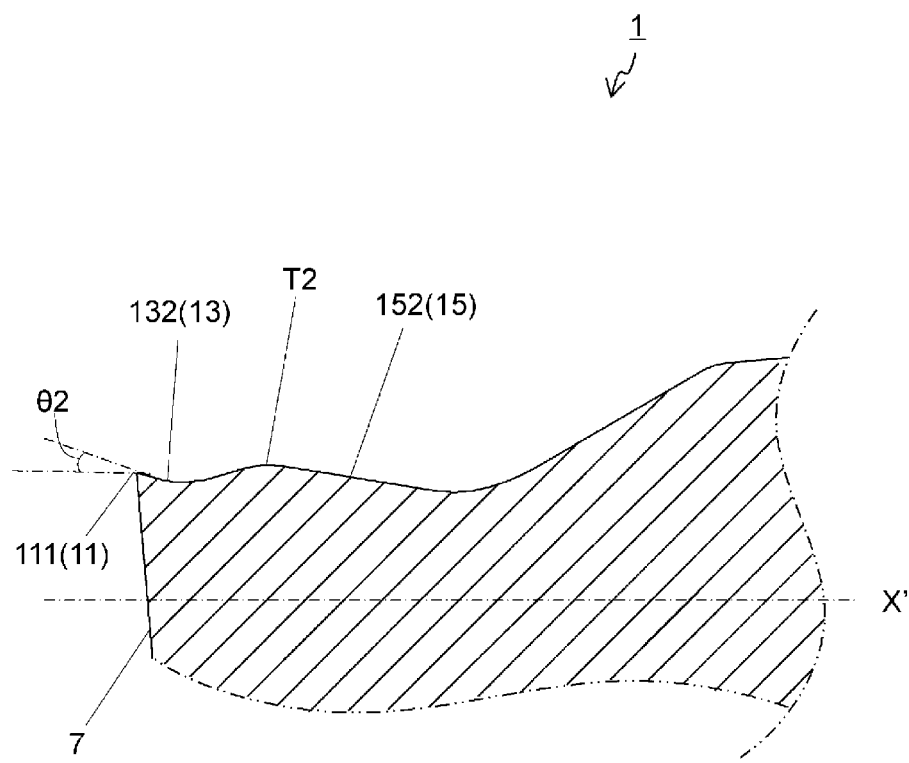
FIG. 11 is a cross-sectional view taken along line E-E in FIG. 5.
Figure 13:
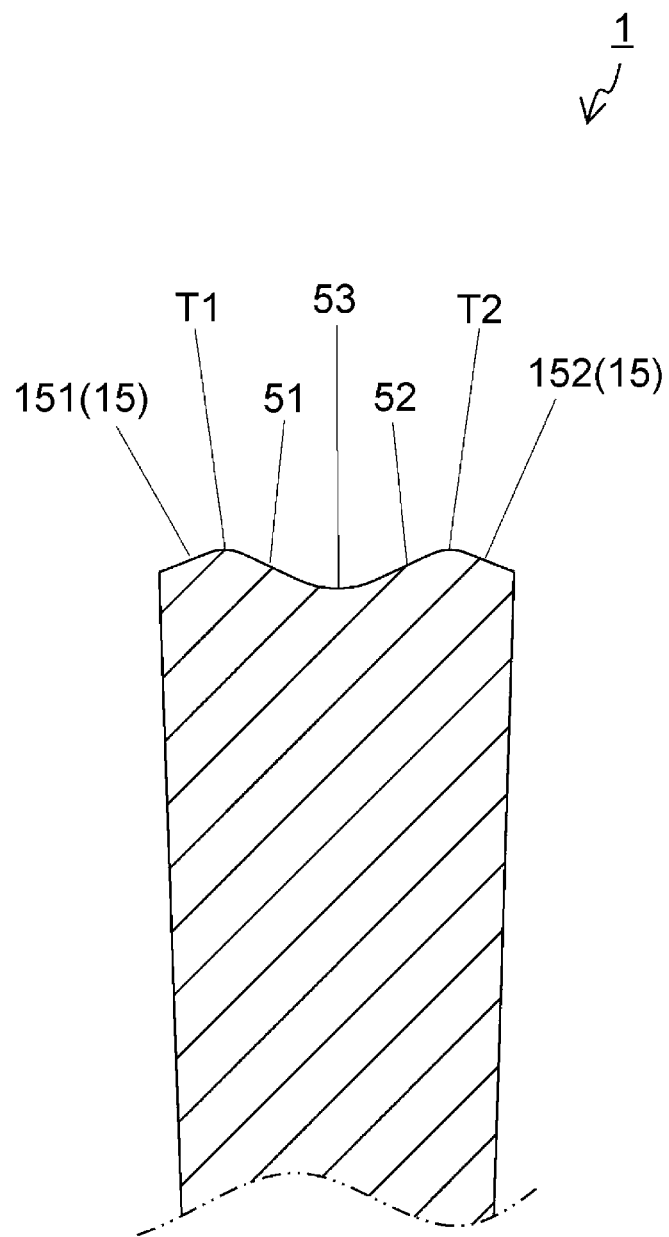
FIG. 13 is a cross-sectional view taken along line G-G in FIG. 5.

Also, the first top portion T1 of the first projection 151 is an uppermost portion of the first projection 151, as illustrated in FIGS. 7 and 13, and the second top portion T2 of the second projection 152 is an uppermost portion of the second projection 152, as illustrated in FIGS. 11 and 13. In other words, the first and second top portions T1 and T2 are the highest located portions of the respective projections.

Here, heights of the top portions T1 and T2 of the first projection 151 and the second projection 152 can be evaluated by cross-sectionally viewing a cross section orthogonal to the first cutting edge 111. The heights of the top portions T1 and T2 of the first and second projections 151 and 152 may be based, for example, on the flat planar region 71 described above. Note that the cross section described above is also a cross section perpendicular to the central axis O1. Thus, as illustrated in FIGS. 7 and 11, in a case where the heights of the top portions T1 and T2 of the first projection 151 and the second projection 152 are evaluated in a cross-sectional view, a straight line X' parallel to the virtual straight line X may be used as a reference.

Note that the height of the first top portion T1 of the first projection 151 may be the same as the height of the second top portion T2 of the second projection 152. In this case, the flow direction of the chips can be stabilized. Here, the height of the first top portion T1 of the first projection 151 being the same as the height of the second top portion T2 of the second projection 152 means that it is only required that the heights of the two top portions are substantially identical, and there may be a slight difference in height between the two top portions.

Also, the first projection 151 and the second projection 152 may be shaped to extend toward the inside of the insert 1 as illustrated in FIG. 4. Also, the first projection 151 and the second projection 152 may be, when viewed from above, symmetrical with respect to a straight line L that passes through a midpoint M of the first cutting edge 111 and that is perpendicular to the first cutting edge 111. That is, when viewed from above, the first projection 151 and the second projection 152 may be located side by side in the A3 direction. Note that, in the description below, for convenience, a side closer to the first cutting edge 111 in a direction along the straight line L (hereinafter, also simply referred to as the A4 direction) is referred to as a front side, and a side away from the first cutting edge 111 in the direction along the straight line L is referred to as a rear side. In the example illustrated in FIG. 4, the "rear side" and the "inner side" coincide with each other.

Also, the first projection 151 and the second projection 152 may be located away from each other in the A3 direction. The spacing between the first projection 151 and the second projection 152 in the A3 direction may decrease while extending away from the first cutting edge 111. That is, the first projection 151 and the second projection 152 may be located closer to each other while extending away from the first cutting edge 111. In this case, the first projection 151 and the second projection 152 facilitate deformation of the chips in the A3 direction and stabilize curling of the chips.

Note that in the example illustrated in FIG. 4, the first projection 151 and the second projection 152 are located away from each other all along the length of each projection. However, for example, a rear end portion of the first projection 151 and a rear end portion of the second projection 152 may be connected to each other.

When viewed from above, the first cutting edge 111 may have a linear shape. In this case, a machined surface, that is, a groove bottom surface for groove-forming, can be machined flat. Note that, when viewed from a side, the first cutting edge 111 may also have a linear shape. In this case, the effect of machining the groove bottom surface flat is further enhanced.

Also, as illustrated in FIG. 4, the first projection 151 and the second projection 152 may be located away from the first cutting edge 111. In other words, an end portion E1 on the front side of the first projection 151 and an end portion E2 on the front side of the second projection 152 are located away from the first cutting edge 111. In a case where the first projection 151 and the second projection 152 are configured as described above, chips can be favorably deformed by the first inclined surface 13 even when the insert 1 is used in what is known as low feed machining with a low feed rate. In the example illustrated in FIG. 4, the end portions E1 and E2 of the first and second projections 151 and 152 are closest to the first cutting edge 111.

Figure 8:
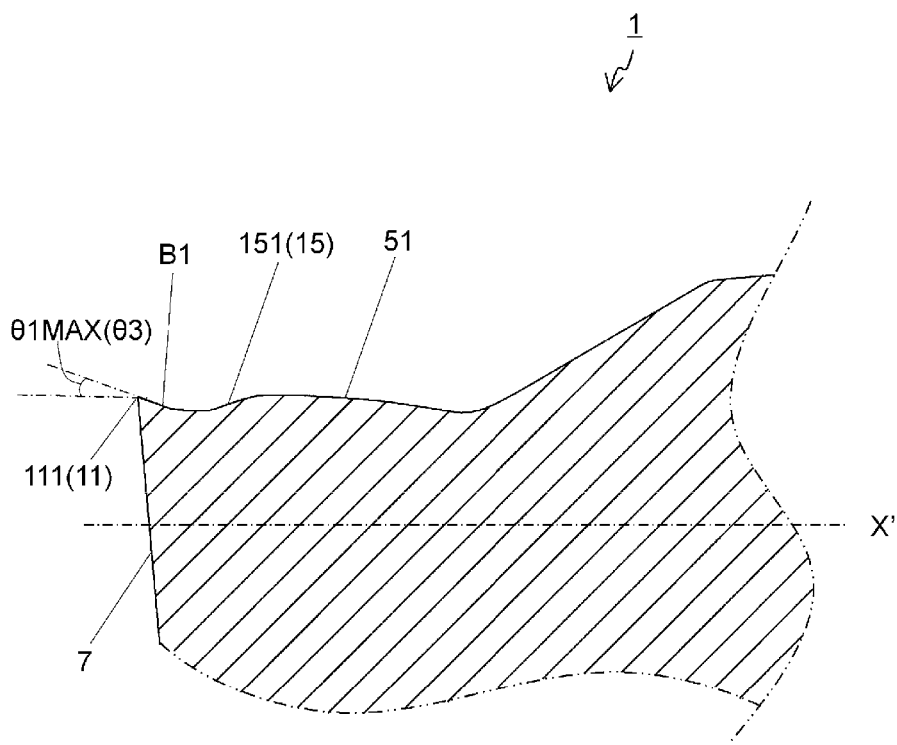
FIG. 8 is a cross-sectional view taken along line B-B in FIG. 5.
Figure 9:
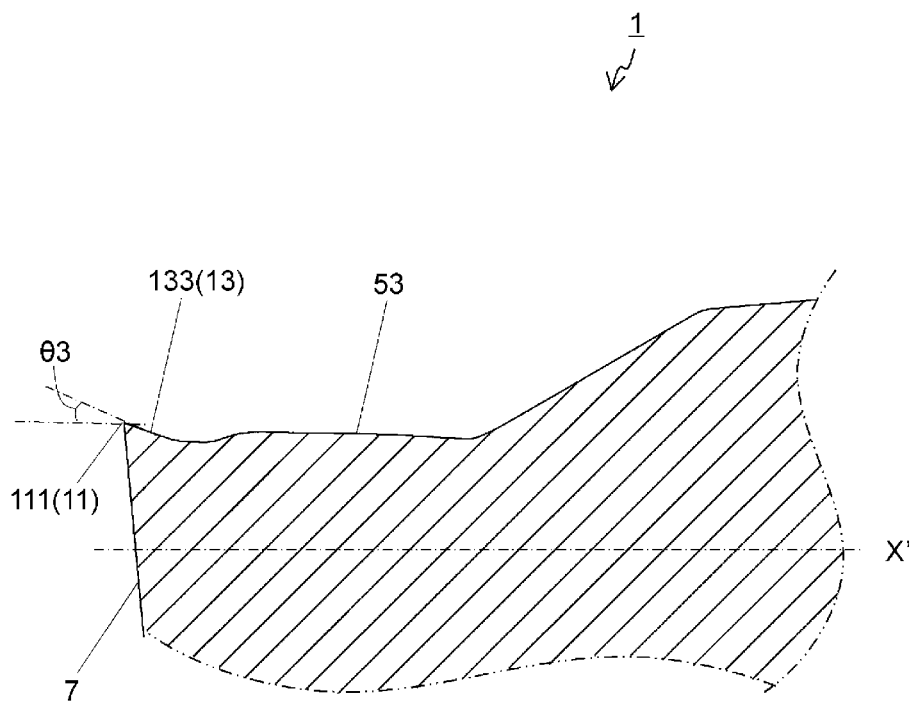
FIG. 9 is a cross-sectional view taken along line C-C in FIG. 5.
Figure 10:
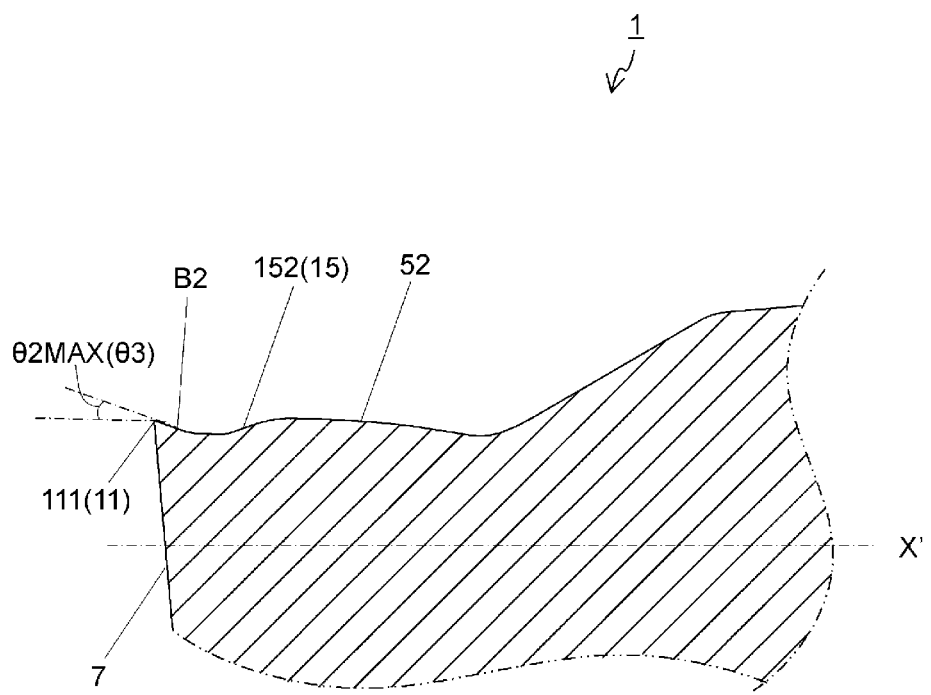
FIG. 10 is a cross-sectional view taken along line D-D in FIG. 5.

The first and second regions 131 and 132 may be smoothly connected to the third region 133. That is, as illustrated in FIG. 8 and FIG. 10, the maximum value (θ1MAX) of the inclination angle θ1 of the first region 131 and the maximum value (θ2MAX) of the inclination angle θ2 of the second regions 132 may be the same as the inclination angle θ3 of the third region 133. In this case, the first inclined surface 13 is a surface that is smooth in the A3 direction, and can come into favorable contact with the chips. As a result, the flow of the chips can be stably controlled.

Also, the inclination angle θ1 of the first regions 131 and the inclination angle θ2 of the second regions 132 may increase at a constant rate in the A3 direction. In this case, the first regions 131 and the second regions 132 themselves are smooth surfaces, thus enhancing the effect of coming into favorable contact with the chips. As a result, the effect of stably controlling the flow of the chips is enhanced.

Figure 6:
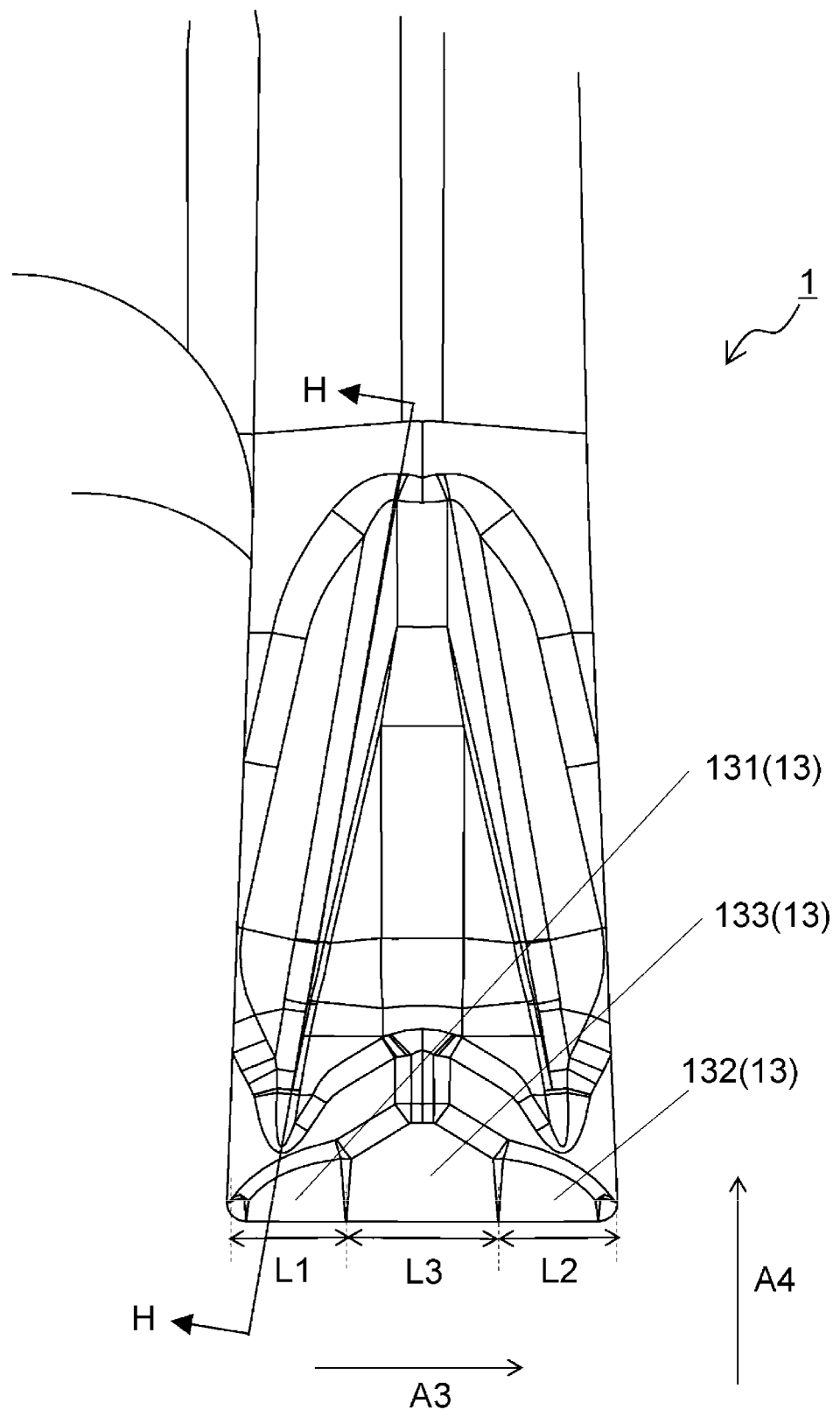
FIG. 6 is a diagram corresponding to FIG. 4 and illustrating a position of a cross section in FIG. 14.

Furthermore, as illustrated in the example illustrated in FIG. 6, a length L3 of the third region 133 in the A3 direction may be greater than a length L1 of the first region 131 and a length L2 of the second region 132, in the A3 direction. That is, L3>L1 and L2 may be satisfied. In this case, by reserving a wide third region 133 where the rake angle is relatively large, the central portion of the chips in the A3 direction can be more suitably recessed. As a result, the effect of squeezing the chips in the A3 direction is enhanced.

For example, the length L1 and the length L2 may be the same, and the length L3 may be 1.2 to 3 times as large as the length L1 and the length L2. Note that, as described below, in a case where the length of the first region 131, the length of the second region 132, and the length of the third region 133 in the A3 direction vary along the A4 direction, the maximum values of the length of the first region 131, the length of the second region 132, and the length of the third region 133 in the A3 direction may satisfy the relationship described above.

Also, as in the example illustrated in FIG. 6, the length L3 of the third region 133 in the A3 direction may decrease while extending away from the first cutting edge 111. In this case, as the chips deformed in the vicinity of the first cutting edge 111 move away from the first cutting edge 111, the opposite ends of the chips in the A3 direction are more easily raised. As a result, squeezing of the chips in the A3 direction is facilitated.

Furthermore, as illustrated in the example illustrated in FIG. 4, when viewed from above, the first boundary portion B1 and the second boundary portion B2 may be orthogonal to the first cutting edge 111. In this case, the flow direction of the chips generated can be stably controlled in both high feed machining with a high feed rate and low feed machining with a low feed rate. As a result, under a wide range of cutting conditions, the chips are stably curled, thus improving machined surface accuracy.

Furthermore, as in the example illustrated in FIGS. 4 and 7, the first top portion T1 of the first projection 151 may be located rearward of the first region 131, and as in the example illustrated in FIGS. 4 and 11, the second top portion T2 of the second projection 152 may be located rearward of the second region 132.

That is, the first top portion T1 of the first projection 151 and the second top portion T2 of the second projection 152 may be located rearward of the first inclined surface 13 functioning as a rake surface. In this case, even in high feed machining, the chips can be suitably curled by the first projection 151 and the second projection 152, thus reducing the possibility of the chips getting stuck.

Also, when viewed from above, the end portion E1 of the first projection 151 is located rearward of the first corner portion 3a1, and when viewed from above, the end portion E2 of the second projection 152 may be located rearward of the second corner portion 3a2. In this case, in low feed machining, the chips are less likely to run on the first projection 151 and the second projection 152, and thus the chips can be suitably deformed by the first inclined surface 13.

Furthermore, as illustrated in the example illustrated in FIG. 4, the first projection 151 includes a first portion 31 located closer to the first cutting edge 111 than the first top portion T1, and the second projection 152 may include a second portion 32 located closer to the first cutting edge 111 than the second top portion T2. As illustrated in FIG. 4, the first portion 31 and the second portion 32 may respectively have first end portions 31X and 32X and second end portions 31Y and 32Y located rearward of the first end portions 31X and 32X.

Figure 14:
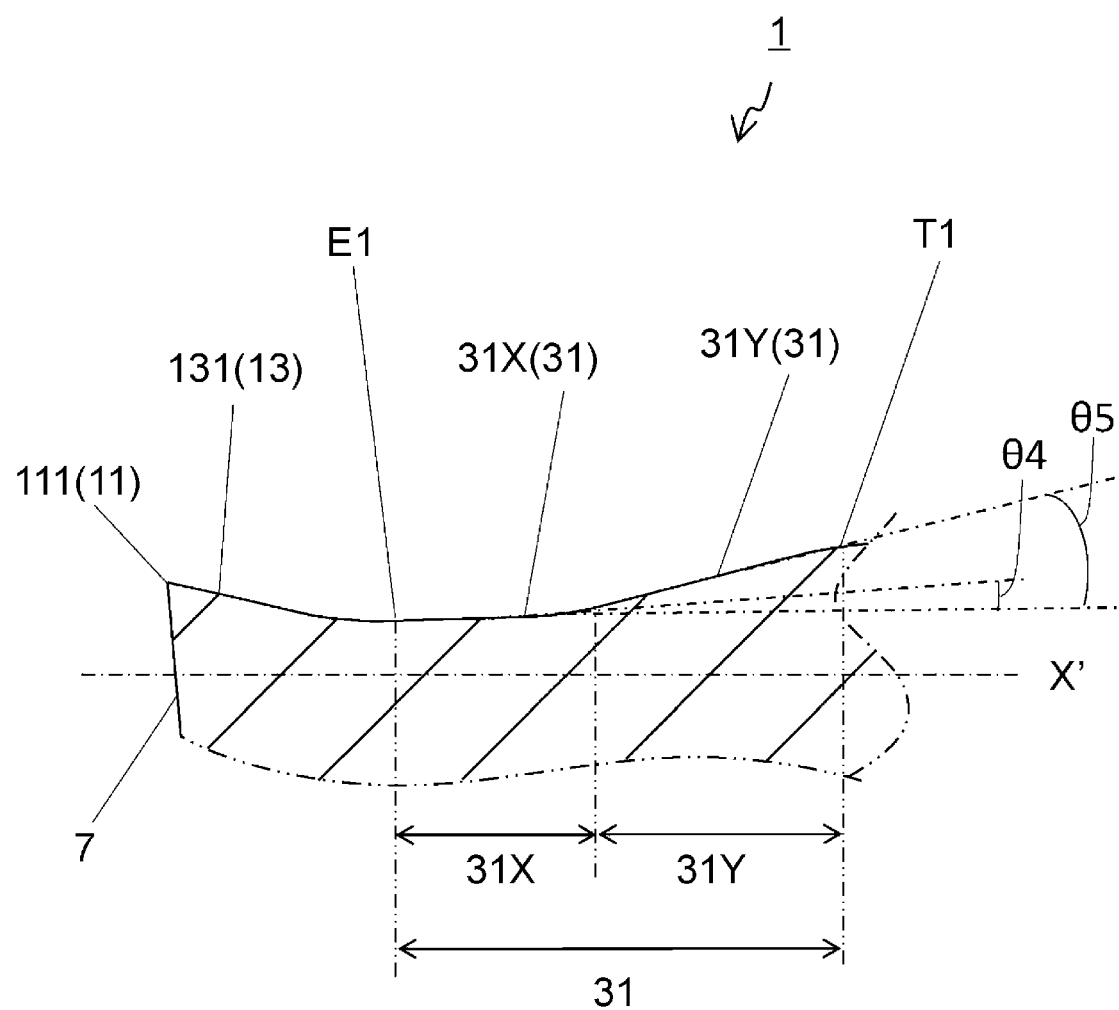
FIG. 14 is a cross-sectional view taken along line H-H in FIG. 6.

In this case, as in an example illustrated in FIG. 14, the first end portions 31X and 32X may be inclined at a first angle θ4 to extend away from the first cutting edge 111 while extending away from the second surface 5, and the second end portions 31Y and the 32Y may be inclined at a second angle θ5 to extend away from the first cutting edge 111 while extending away from the second surface 5 (the second portion 32 is not illustrated).

The second angle θ5 may be larger than the first angle θ4. In this case, the chips squeezed by the first inclined surface 13 can be brought into stepwise contact with the first projection 151 and the second projection 152. Thus, the first projection 151 and the second projection 152 can suitably facilitate deformation of the chips.

Also, as illustrated in the example illustrated in FIG. 4, the first end portion 31X and the second end portion 31Y of the first portion 31 may be located inward of the first region 131, and the first end portion 32X and the second end portion 32Y of the second portion 32 may be located inward of the second region 132.

Furthermore, as illustrated in FIG. 4, the first projection 151 may include a third portion 33 located rearward of the first top portion T1, and the second projection 152 may include a fourth portion 34 located rearward of the second top portion T2. In this case, the third portion 33 and the fourth portion 34 may respectively have flat surfaces 51 and 52 inclined toward the second surface 5 while extending from the corresponding top portions T1 and T2 toward the center in the A3 direction.

Furthermore, when viewed from above, the flat surface 51 of the third portion 33 may be located across the first boundary portion B1, and the flat surface 52 of the fourth portion 34 may be located across the second boundary portion B2. In this case, the chips squeezed in the direction along the first cutting edge 111 can be sandwiched between the flat surface 51 and 52, thus allowing the chips to be further squeezed.

Note that here, the flat surface 51 being located across the first boundary portion B1 means that the flat surface 51 is located across a virtual extended line N1 of the first boundary portion B1, as illustrated in FIG. 4. The flat surface 52 being located across the second boundary portion B2 means that the flat surface 52 is located across a virtual extended line N2 of the second boundary portion B2, as illustrated in FIG. 4.

Figure 12:
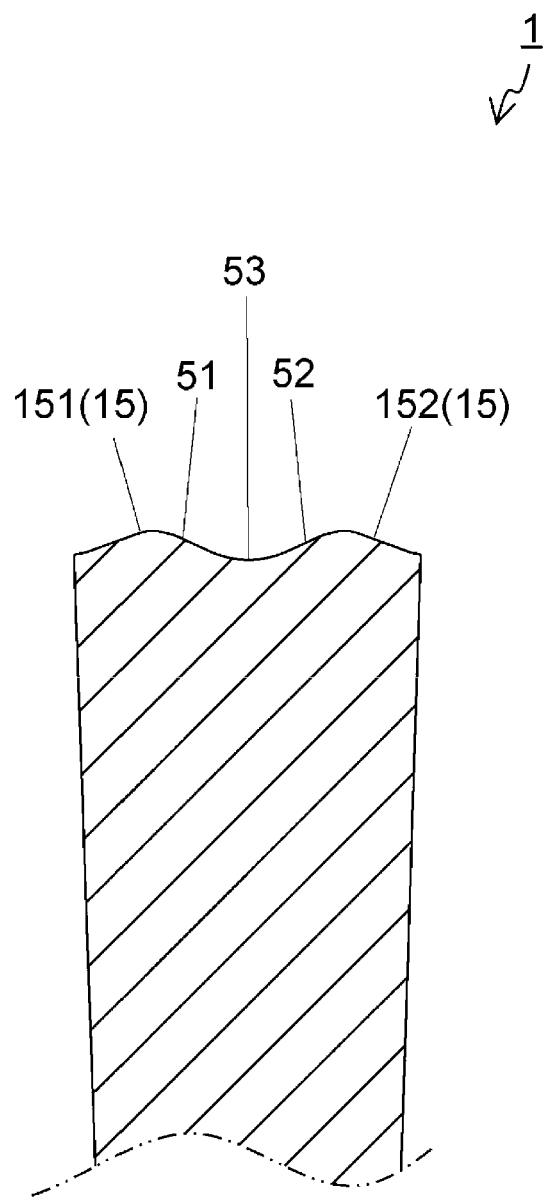
FIG. 12 is a cross-sectional view taken along line F-F in FIG. 5.

Note that the flat surfaces 51 and 52 may be located away from each other. That is, another surface may be located between the flat surfaces 51 and 52. As an example of another surface, a curved surface 53 is illustrated in FIG. 12. In this manner, the flat surfaces 51 and 52 may be separated from each other or partially connected together. Also, flat surface 51 and flat surface 52 may be connected together by a curved surface and a plane.

Second Embodiment

An insert 21 according to Second Embodiment of the present disclosure will now be described with reference to FIG. 15. Note that, in the description below, differences from the insert 1 of First Embodiment will be focused on. Thus, for components similar to the corresponding components of First Embodiment, the description in First Embodiment is incorporated in Second Embodiment by reference, and description of these components is omitted.

Figure 15:
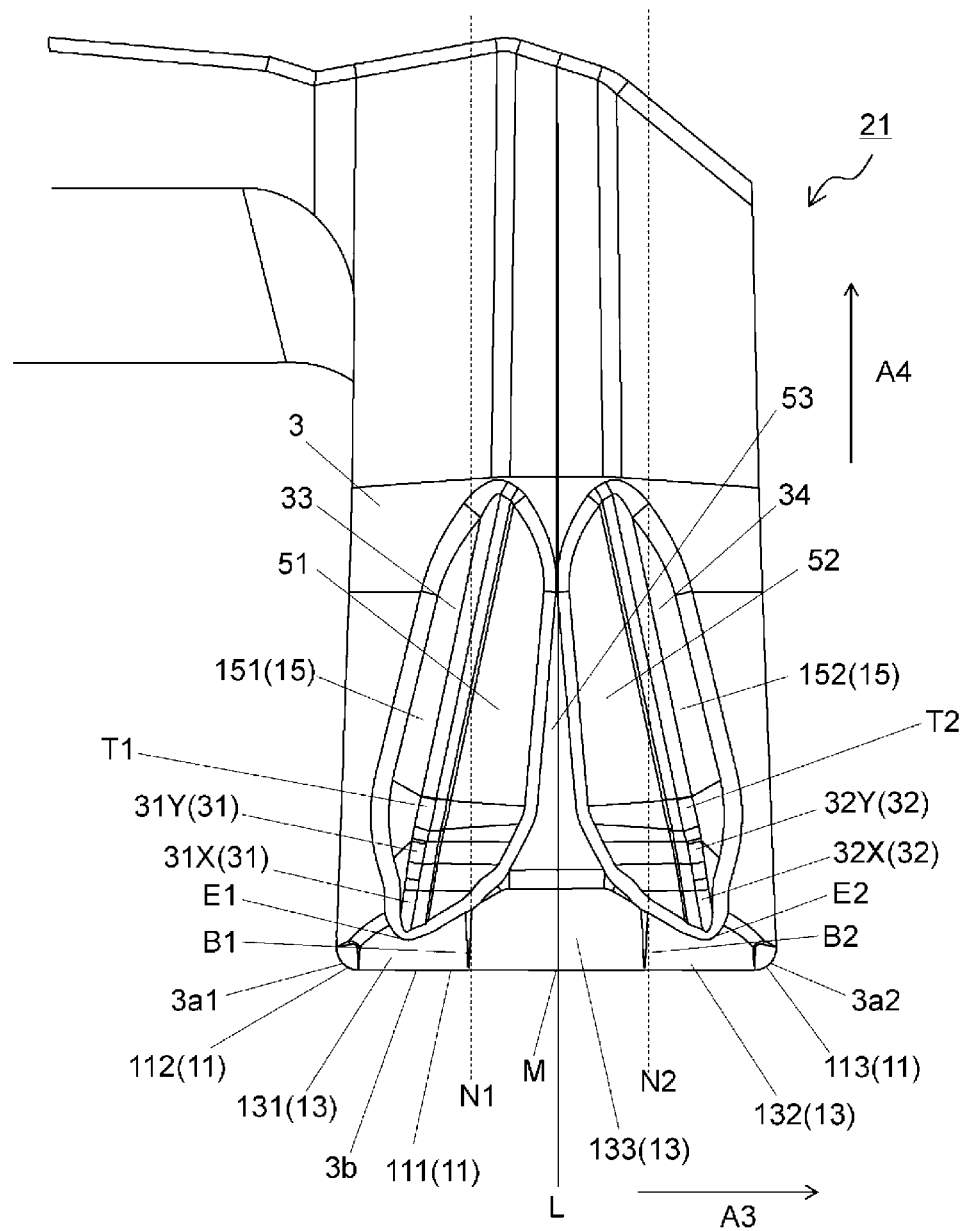
FIG. 15 is an enlarged front view of a main portion of a first surface of a cutting insert according to an embodiment of the present disclosure.

The insert 21 in an example illustrated in FIG. 15, like the insert 1 of First Embodiment, includes a first surface 3, a second surface 5, a side surface 7, a through-hole 9, and a cutting edge 11. As illustrated in FIG. 15, a first surface 3 includes a first inclined surface 13 and a projection 15. The first inclined surface 13 includes a first region 131, a second region 132, and a third region 133, and the projection 15 includes a first projection 151 and a second projection 152.

The first projection 151 has a first portion 31 located closer to a first cutting edge 111 than a first top portion T1, and the second projection 152 includes a second portion 32 located closer to the first cutting edge 111 than a second top portion T2. The first and second portions 31 and 32 respectively have first end portions 31X and 32X and second end portions 31Y and 32Y located rearward of the first end portions 31X and 32X.

The example insert 21 illustrated in FIG. 15 differs from the insert 1 of First Embodiment in the arrangement of the first end portions 31X and 32X and second end portions 31Y and 32Y. That is, in the example illustrated in FIG. 15, the first end portion 31X of the first portion 31 is located in the first region 131, and the first end portion 32X of the second portion 32 is located in the second region 132. In this case, chips squeezed by the first inclined surface 13 can be brought into stepwise contact with the first projection 151 and the second projection 152. Thus, the first projection 151 and the second projection 152 can more suitably facilitate deformation of the chips.

Also, the second end portion 31Y of the first portion 31 may be located rearward of the first region 131, and the second end portion 32Y of the second portion 32 may be located rearward of the second region 132. In this case, in high feed machining, the chips squeezed by the first inclined surface 13 can be stably brought into stepwise contact with the first projection 151 and the second projection 152, thus enabling a reduction in the possibility of the chips getting stuck.

Note that, as illustrated in FIG. 15, the length L3 of the third region 133 may be constant along an A4 direction. Also, a rear end portion of the first projection 151 may be connected to a rear end portion of the second projection 152. Any of the configurations can exert chip squeezing action in the A3 direction.

Cutting Tool

Now, description will be given of a cutting tool 101 according to an embodiment of the present disclosure using the drawings.

Figure 16:
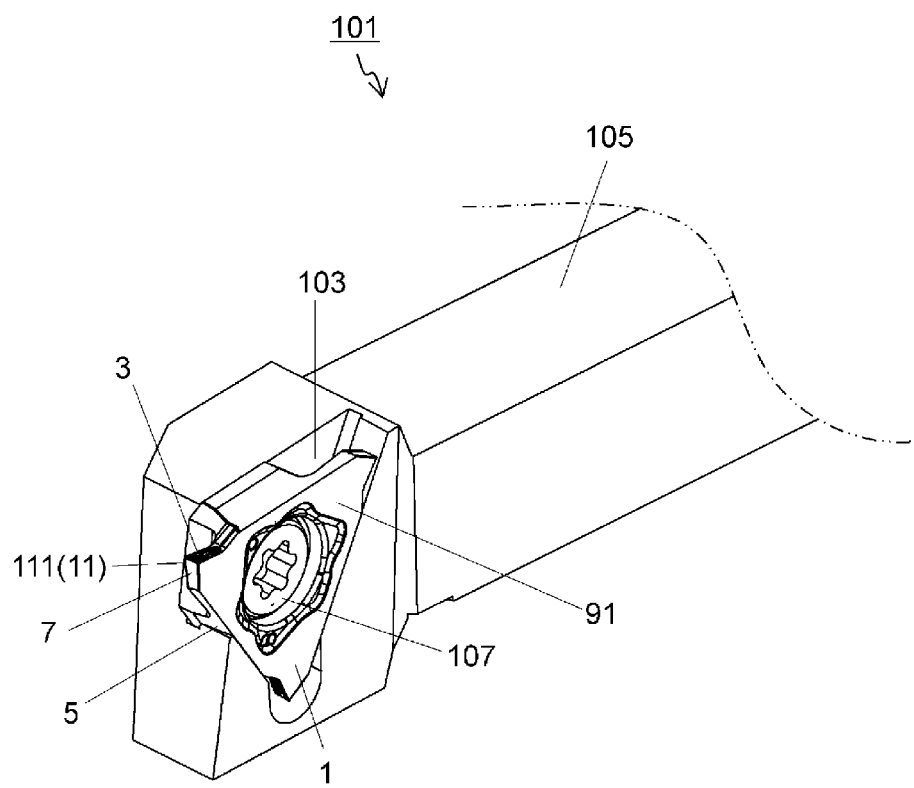
FIG. 16 is a perspective view illustrating a cutting tool according to an embodiment of the present disclosure.
Figure 17:
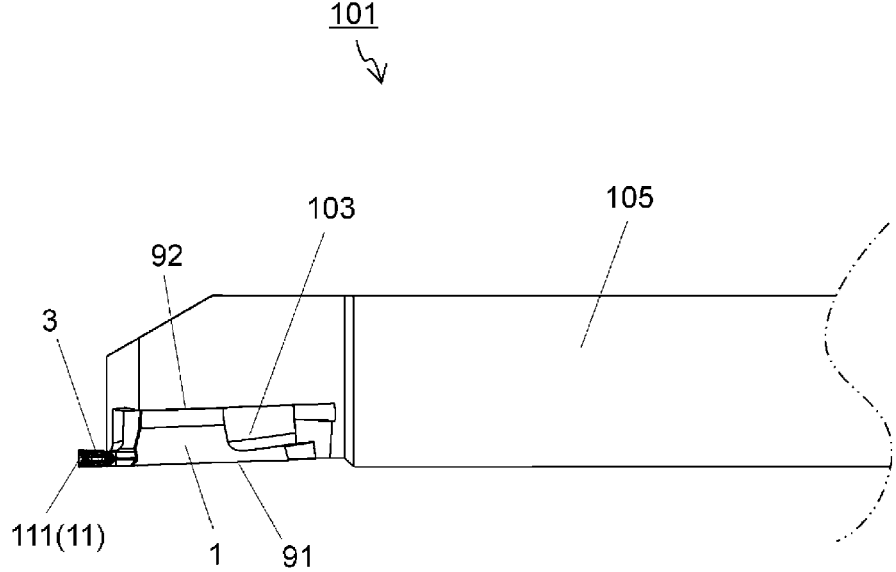
FIG. 17 is a front view of the cutting tool illustrated in FIG. 16.
Figure 18:
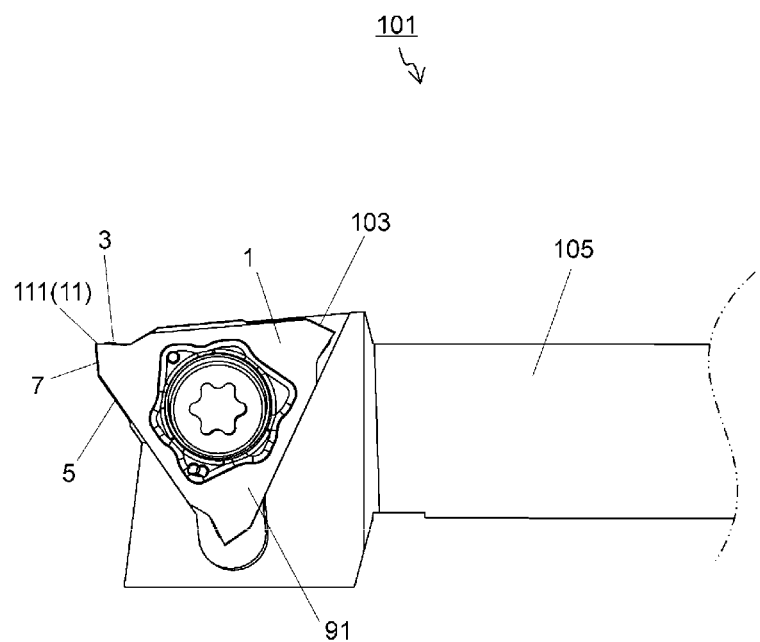
FIG. 18 is a side view of the cutting tool illustrated in FIG. 16.

The cutting tool 101 of the embodiment includes a holder 105 and an insert 1. The holder 105 includes an insert pocket 103 (hereinafter also referred to simply as the pocket 103) located at a first end of the holder 105, and the insert 1 is mounted in the pocket 103, as illustrated in FIGS. 16 to 18. In this case, the insert 1 may be mounted in the pocket 103 such that at least the first cutting edge 111 projects from the first end of the holder 105, in other words, such that the first cutting edge 111 projects outward from the holder 105.

The holder 105 of the present embodiment may be shaped like an elongated rod extending from the first end toward a second end. One pocket 103 is provided at the first end of the holder 105 in an example illustrated in FIG. 16. The pocket 103 is a portion in which the insert 1 is mounted and may be open to an end surface of the first end of the holder 105. Note that, in FIGS. 16 to 18, the second end of the holder 105 is omitted.

The insert 1 may be secured to the holder 105 by the following method, for example. A screw hole (not illustrated) is formed in the pocket 103. The insert 1 is placed in the pocket 103 such that the through-hole in insert 1 is located coaxially with the screw hole. A set screw 107 is inserted into the through-hole in the insert 1 and secured in the screw hole in the pocket 103. Thus, the insert 1 may be secured in the holder 105.

As a material of the holder 105, for example, steel or cast iron can be used. In particular, among these materials, steel, having high toughness, is preferably used.

Method for Manufacturing Machined Product

Next, a description will be given of a method for manufacturing a machined product according to an embodiment of the present invention while referencing the drawings.

The machined product is manufactured by machining a work material 201. In the embodiment, an example of machining is groove-forming. The method for manufacturing a machined product in the embodiment includes the following steps. Specifically, the method includes the steps of:

(1) rotating the work material 201;

(2) bringing at least the front cutting edge 11 of the cutting tool 101 exemplified in the above embodiment into contact with the work material 201 that is rotating; and (3) separating the cutting tool 101 from the work material 201.

Figure 19:
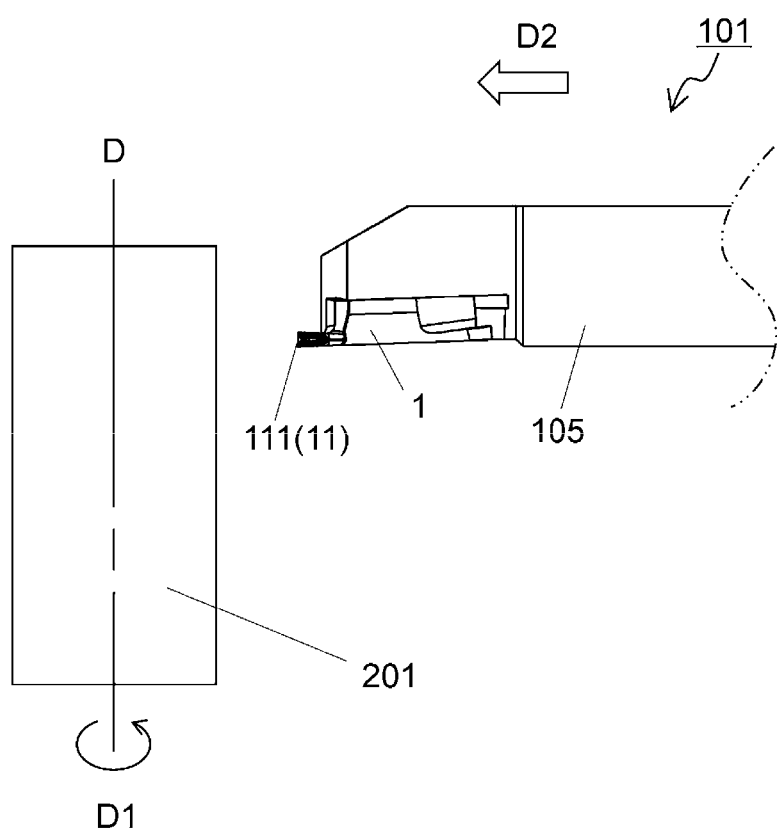
FIG. 19 is a schematic diagram illustrating one step of a method for manufacturing a machined product according to an embodiment of the present disclosure.
Figure 20:
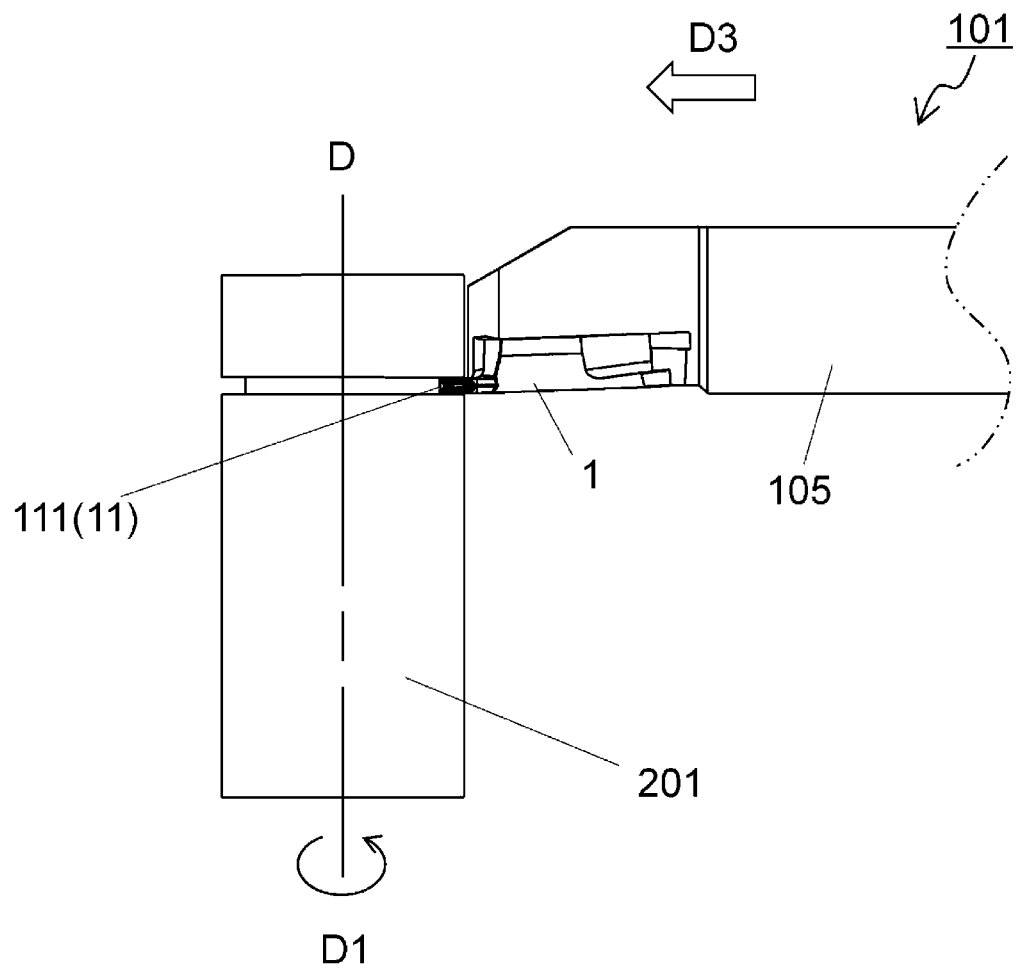
FIG. 20 is a schematic diagram illustrating one step of the method for manufacturing a machined product according to an embodiment of the present disclosure.

More specifically, first, as illustrated in FIG. 19, the work material 201 is rotated in a D1 direction about an axis D. The cutting tool 101 is brought relatively close to the work material 201 by moving the cutting tool 101 in a D2 direction. Then, as illustrated in FIG. 20, the cutting edge 11 of the cutting tool 101 is brought into contact with the work material 201 to cut the work material 201. At this time, a groove is formed by cutting the work material 201 and moving the cutting tool 101 in a D3 direction. Then, as illustrated in FIG. 21, the cutting tool 101 is relatively moved away from the work material 201 by moving the cutting tool 101 in a D4 direction.

In the example illustrated in FIG. 19, the cutting tool 101 is brought close to the work material 201, with the axis D fixed and the work material 201 rotating. Also, in FIG. 20, the work material 201 is cut by bringing the cutting edge 11 of the insert 1 into contact with the work material 201 that is rotating. Also, in FIG. 21, the cutting tool 101 is moved away from the work material 201, with the work material 201 rotating.

Figure 21:
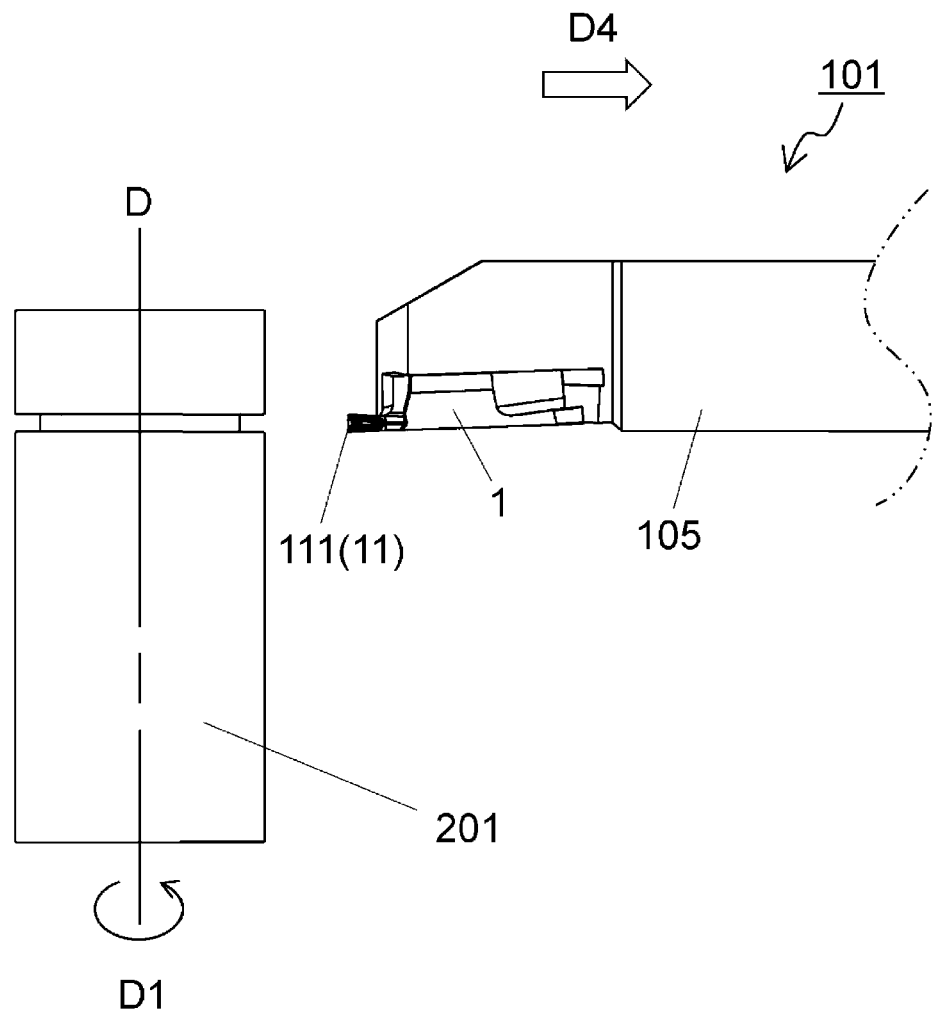
FIG. 21 is a schematic diagram illustrating one step of the method for manufacturing a machined product according to an embodiment of the present disclosure.

Note that, in the machining in the example illustrated in FIGS. 19 to 21, in each of the steps, the cutting tool 101 is brought into contact with or separated from the work material 201 by moving the cutting tool 101 but that the present embodiment is of course not limited to such a mode.

For example, in step (1), the work material 201 may be brought close to the cutting tool 101. In the same manner, in step (3), the work material 201 may be moved away from the cutting tool 101. In a case where the machining is to be continued, the step of bringing the cutting edge 11 of the insert 1 into contact with a different portion of the work material 201 may be repeated, with the work material 201 kept rotating.

Note that examples of the material of the work material 201 include carbon steel, alloy steel, stainless steel, cast iron, or non-ferrous metal.

Embodiments according to the present disclosure are described above. However, the present disclosure is not limited to the aforementioned embodiments, and naturally includes various modifications within a scope that does not deviate from the spirit of the present disclosure.

REFERENCE SIGNS LIST

1 Cutting insert (insert)
3 First surface
3a1 First corner portion
3a2 Second corner portion 3b First side
5 Second surface
7 Third surface (side surface)
9 Through-hole
10 Cutting portion
11 Cutting edge
111 First cutting edge
13 First inclined surface
131 First region
132 Second region
133 Third region
15 Projection
151 First projection
152 Second projection
31 First portion
31X First end portion
31Y Second end portion
32 Second portion
32X First end portion
32Y Second end portion
33 Third portion
34 Fourth portion
51, 52 Flat surface
53 Plane
91 First major surface
92 Second major surface
101 Cutting tool
103 Insert pocket
105 Holder
107 Set screw
201 Work material

The invention claimed is:

1. A cutting insert comprising:
a first surface comprising a first corner portion, a second corner portion, and a first side located between the first corner portion and the second corner portion;
a second surface located away from the first surface;
a third surface connecting to the first side of the first surface and to the second surface; and
a cutting edge located on a ridge line where the first surface and the third surface intersect, wherein
the cutting edge comprises a first cutting edge located on the first side,
the first surface comprises:
a first inclined surface located along the first side and inclined toward the second surface while extending away from the first side; and
one or more convex projections,
the first inclined surface comprises:
a first region located close to the first corner portion;
a second region located close to the second corner portion; and
a third region located between the first region and the second region,
the one or more convex projections comprise:
a first projection located close to the first corner portion and located away from the first cutting edge; and
a second projection located close to the second corner portion and located away from the first cutting edge,
the first region has a first inclination angle increasing while extending away from the first corner portion in a direction along the first cutting edge, the second region has a second inclination angle increasing while extending away from the second corner portion in the direction along the first cutting edge, and the third region has a third inclination angle equal to or greater than the first inclination angle of the first region and the second inclination angle of the second region, and
in a top view, the first region is located on a first straight line that is orthogonal to the first cutting edge and passes through an end portion on a front side of the first projection, and the second region is located on a second straight line that is orthogonal to the first cutting edge and passes through an end portion on a front side of the second projection.

2. The cutting insert according to claim 1, wherein the first cutting edge has a linear shape in a top view.

3. The cutting insert according to claim 1, wherein the first inclination angle of the first region and the second inclination angle of the second region increase at a constant rate in the direction along the first cutting edge.

4. The cutting insert according to claim 1, wherein a third length of the third region in the direction along the first cutting edge is greater than a first length of the first region and a second length of the second region in the direction along the first cutting edge.

5. The cutting insert according to claim 1, wherein a third length of the third region in the direction along the first cutting edge decreases while extending away from the first cutting edge.

6. The cutting insert according to claim 1, wherein
the first top portion of the first projection is located rearward of the first region, and
the second top portion of the second projection is located rearward of the second region.

7. The cutting insert according to claim 1, wherein
the first projection comprises a first portion,
the second projection comprises a second portion,
in a top view, the first portion is located between the first cutting edge and the first top portion in a direction orthogonal to the first cutting edge, and the second portion is located between the first cutting edge and the second top portion in a direction orthogonal to the first cutting edge,
each of the first portion and the second portion comprises:
a first tip portion inclined at a first angle to extend away from the first cutting edge while extending away from the second surface; and
a second tip portion located rearward of the first tip portion and inclined at a second angle to extend away from the first cutting edge while extending away from the second surface, and
the second angle is greater than the first angle.

8. The cutting insert according to claim 7, wherein the first tip portion of the first portion is located in the first region, and the first tip portion of the second portion is located in the second region.

9. The cutting insert according to claim 7, wherein the second tip portion of the first portion is located rearward of the first region, and the second tip portion of the second portion is located rearward of the second region.

10. The cutting insert according to claim 1, wherein
the first projection comprises a third portion located rearward of the first top portion,
the second projection comprises a fourth portion located rearward of the second top portion,
each of the third portion and the fourth portion comprises a flat surface inclined toward the second surface while extending from the corresponding top portion toward a center of the first surface in the direction along the first cutting edge, and in a top view, the flat surface of the third portion is spanning across the first boundary portion, and the flat surface of the fourth portion is spanning across the second boundary portion.

11. A cutting tool comprising:
a holder; and
the cutting insert according to claim 1 mounted in the holder.

12. A method for manufacturing a machined product, the method comprising:
rotating a work material;
bringing the cutting tool according to claim 11 into contact with the work material that is rotating; and
separating the cutting tool from the work material.

13. A cutting insert comprising:
a first surface comprising a first corner portion, a second corner portion, and a first side located between the first corner portion and the second corner portion;
a second surface located away from the first surface;
a third surface connecting to the first side of the first surface and to the second surface; and
a cutting edge located on a ridge line where the first surface and the third surface intersect, wherein
the cutting edge comprises a first cutting edge located on the first side,
the first surface comprises:
  a first inclined surface located along the first side and inclined toward the second surface while extending away from the first side; and
  one or more convex projections,
the first inclined surface comprises:
  a first region located close to the first corner portion;
  a second region located close to the second corner portion; and
  a third region located between the first region and the second region,
the one or more convex projections comprise:
  a first projection located close to the first corner portion and located away from the first cutting edge; and
  a second projection located close to the second corner portion and located away from the first cutting edge,
the first region has a first inclination angle increasing while extending away from the first corner portion in a direction along the first cutting edge, the second region has a second inclination angle increasing while extending away from the second corner portion in the direction along the first cutting edge, and the third region has a third inclination angle which is constant along the first cutting edge and is equal to or greater than the first inclination angle of the first region and the second inclination angle of the second region,
in a top view, the first region is located on a first straight line that is orthogonal to the first cutting edge and passes through an end portion on a front side of the first projection, and the second region is located on a second straight line that is orthogonal to the first cutting edge and passes through an end portion on a front side of the second projection.

\* \* \* \* \*